United States Patent [19]

Witmore

[11] Patent Number: 4,485,469
[45] Date of Patent: Nov. 27, 1984

[54] TIME SLOT INTERCHANGER

[75] Inventor: Ronald K. Witmore, Lafayette, Colo.

[73] Assignee: AT&T Bell Laboratories, Murray Hill, N.J.

[21] Appl. No.: 413,155

[22] Filed: Aug. 30, 1982

[51] Int. Cl.³ .............................................. H04J 3/00
[52] U.S. Cl. ...................................... 370/68; 370/62
[58] Field of Search .................................. 370/62, 68

[56] References Cited

U.S. PATENT DOCUMENTS

| | | | |
|---|---|---|---|
| 4,112,258 | 9/1978 | Alles | 179/15 AT |
| 4,377,859 | 3/1983 | Dunning et al. | 370/68 |

OTHER PUBLICATIONS

"An Experimental Digital Switch for Data and Voice"; Session 21B, Paper 3, International Switching Symposium; Sep. 1981; pp. 1–7.

"An Experimental User–Resident Communications Controller Supporting Sub-rate Circuit Switched Service"; International Symposium on Subscriber Loops and Services; 1980; pp. 68–71.

"An Overview of a Flexible Digital Switching System"; Communication Techniques Seminar; Mar. 1979; pp. 2-1 to 2-5.

*Primary Examiner*—Robert L. Griffin
*Assistant Examiner*—Frank M. Scutch, III
*Attorney, Agent, or Firm*—Donald M. Duft

[57] ABSTRACT

A programmed controlled signal processor operating as a time slot interchanger and having improved conferencing facilities is disclosed. A conference accumulator RAM is used that has a memory location unique to each conference call served by the system. A unique RAM location is assigned to the serving of each conference call in order to facilitate the generation of the required sum and difference signals. The use of an individual accumulator RAM position for this purpose permits the use of a simpler instruction set for the signal processor. This simpler instruction set permits a plurality of instructions for the serving of a given conference call to be interspersed with instructions for other calls rather than be contiguous to one another.

20 Claims, 17 Drawing Figures

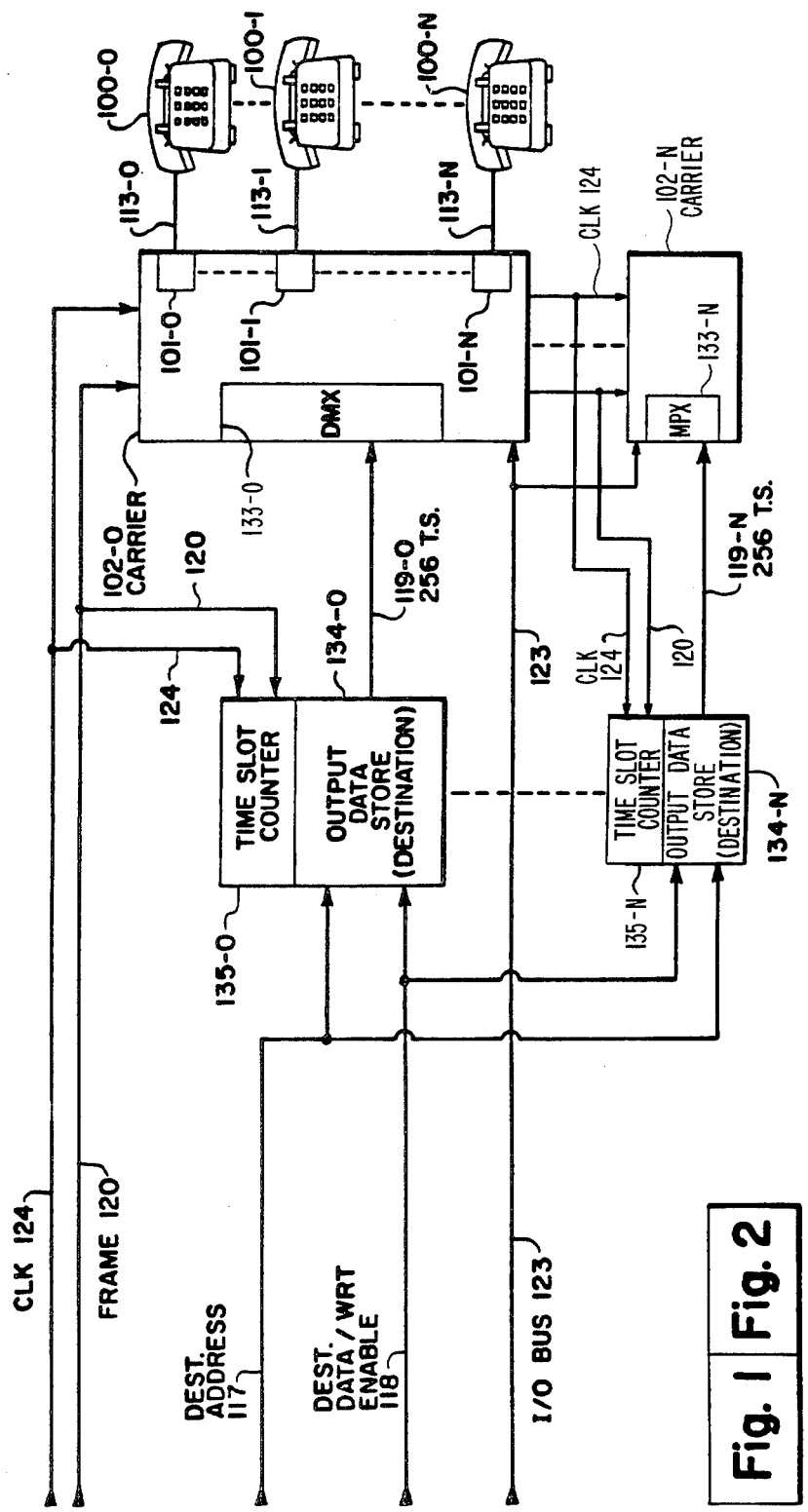

INSTRUCTION FORMAT

| OP CODE | LOSS | DESTINATION ADDRESS | | SOURCE ADDRESS |
|---|---|---|---|---|
| | | | ACCUMULATOR NUMBER | |
| 4 BITS | 4 BITS | 11 BITS | 8 BITS | 11 BITS |

Fig. 7

NON CONFERENCE INSTRUCTIONS
(2-PARTY CALL)

| | OP CODE | LOSS | DESTINATION ADDRESS | SOURCE ADDRESS |
|---|---|---|---|---|
| 1 | SD | 0 | B | A |

| | OP CODE | LOSS | DESTINATION ADDRESS | SOURCE ADDRESS |
|---|---|---|---|---|
| 2 | SD | 0 | A | B |

SD = SOURCE TO DESTNATION

Fig. 8

INSTRUCTION 0 (BACKGROUND FUNCTION)
INSTRUCTION 1 (AT TIME OF DISCONNECT)

| OP CODE | LOSS | DESTINATION ADDRESS | SOURCE ADDRESS |
|---|---|---|---|
| SD | 0 | PORT TIME SLOT | IDLE CODE SOURCE |

Fig. 9

CONFERENCE INSTRUCTIONS
(3-PARTY CALL)

1

| OP CODE | LOSS | ACCUMULATOR NUMBER | SOURCE ADDRESS |
|---|---|---|---|
| SA | 0 | 29 | A |

2

| OP CODE | LOSS | ACCUMULATOR NUMBER | SOURCE ADDRESS |
|---|---|---|---|
| SPA | 0 | 29 | B |

3

| OP CODE | LOSS | ACCUMULATOR NUMBER | SOURCE ADDRESS |
|---|---|---|---|
| SPA | 0 | 29 | C |

4

| OP CODE | LOSS | ACCUMULATOR NUMBER | SOURCE ADDRESS |
|---|---|---|---|
| MSAD | 0 | 29 | A |

5

| OP CODE | LOSS | ACCUMULATOR NUMBER | SOURCE ADDRESS |
|---|---|---|---|
| MSAD | 0 | 29 | B |

6

| OP CODE | LOSS | ACCUMULATOR NUMBER | SOURCE ADDRESS |
|---|---|---|---|
| MSAD | 0 | 29 | C |

SA = SOURCE TO ACCUMULATOR
SPA = SOURCE PLUS ACCUMULATOR TO ACCUMULATOR
MSAD = MINUS SOURCE PLUS ACCUMULATOR TO DESTINATION

Fig. 10

FREE-PAIRS LIST (AVAILABLE PROGRAM STORE LOCATIONS)

| 255 | BUSY | 510,511 |
| 105 | BUSY | 210,211 |
| 62 | IDLE | 124,125 |
| 25 | IDLE | 50,51 |
| 3 | IDLE | 6,7 |
| 2 | BUSY | 4,5 |
| 1 | BUSY | 2,3 |

THIS TABLE REPRESENTS THE CONFIGURATION OF THE FREE-PAIRS LIST DURING CONNECTION 1, BUT PRIOR TO CONNECTION 255 AS ILLUSTRATED IN FIG. 17.

Fig. 16

CONNECTION (ACCUMULATOR NUMBER) LISTS

1

| 12 | |
| 11 | |
| 10 | |
| 9 | |
| 8 | |
| 7 | 4,5 |
| 6 | |
| 5 | |
| 4 | |
| 3 | |
| 2 | PORT B |
| 1 | PORT A |

| 2 |

| 1 |

NON-CONFERENCE CONNECTION
TWO-PARTY CALL

255

| 12 | |
| 11 | |
| 10 | |
| 9 | 50,51 |
| 8 | 124,125 |
| 7 | 6,7 |
| 6 | |
| 5 | |
| 4 | |
| 3 | PORT C |
| 2 | PORT B |
| 1 | PORT A |

| 3 |

| 3 |

CONFERENCE CONNECTION
THREE-PARTY CALL

INSTRUCTION PAIRS ON SELECTED CONNECTION LIST

IDENTIFIED PORT TIME SLOTS

NUMBER OF PARTIES ON CONNECTION

NUMBER OF INSTRUCTION PAIRS USED FOR CONNECTION

Fig. 17

TIME SLOT INTERCHANGER

TECHNICAL FIELD

This invention relates to a time slot interchanger for a time division multiplex switching system.

BACKGROUND OF THE INVENTION

Time Slot Interchange (TSI) facilities are used in time division multiplex switching systems to interconnect a calling station served by a first system time slot to a called station served by a second system time slot. This permits a common signal path to serve concurrently a plurality of calls by time sharing the use of the common path. Each call connection is granted exclusive use of the path for the time interval defined by the system time slots associated with the connection.

A basic version of a time slot interchanger comprises a time slot driven RAM which is written with call information during a first time slot under control of a first source of address information and which is read out during a second time slot under control of a second source of address information. Each system time slot is associated with a unique RAM location as well as with a unique station served by the system. PCM encoded " speech" signals generated at a first station involved on a call are written into the associated RAM location during the occurrence of the time slot associated with the first station with the output of the system's time slot counter being used as the addressing signal source. This PCM call information is transferred to a second station involved on the call during the occurrence of the system time slot assigned to the second station. This transfer is effected by applying the output of the system time slot counter to a translation RAM which generates an output signal identifying the time slot serving the first station. This generated time slot number is applied as addressing information to the time slot driven RAM which reads out the call information from its addressed location and applies the readout information to facilities that extend it to the second station.

U.S. Pat. No. 4,112,258 issued Sept. 5, 1978 to H. G. Alles discloses an improved time slot interchanger that comprises a program controlled signal processor. In addition to performing a conventional time slot interchange function, the Alles TSI can insert a specified gain or loss into the interchange of any call signal. The Alles TSI also provides conferencing facilities. These facilities include the use of a single register operating as an accumulator for generating and storing the conferee sum and difference signals required in the serving of conference calls.

In most conference circuits, signals are generated that represent the summation of the speech signals of all conference parties. Signals are also generated which represent the difference between the summation signal and the signal contributed by each conferee. A unique difference signal is generated for each party so that the resultant signal transmitted to the party represents the summation signal less the speech signal contributed by the party. This permits each party to hear only the other conferees, and not his or her own speech, in the receiver of the station handset.

The signal summation operation and the generation of the various difference signals are effected in Alles by the repeated use of the single accumulated register as his signal processor executes the instructions stored in the controlling memory of his TSI. The provision of a single accumulator register for the concurrent serving of all conference calls requires that the plurality of instructions associated with a conference call be contiguous to one another within the memory. This is necessary so that the required summation and difference signals for a first conference call can be generated sequentially and transmitted to the conferee parties before the signal processor executes instructions for other conference calls. If the program instructions for a first conference call were not contiguous, information in the accumulator RAM pertaining to the first call would be overwritten with information pertaining to a second conference call. The subsequent execution of an instruction associated with the first call, and involving the use of the accumulator, would generate meaningless information since the accumulator would then contain information pertaining to the second call.

The provision of a single accumulator RAM in Alles imposes programming restraints since the establishment and serving of each new conference call requires the Alles system controller to communicate with the TSI memory to determine that there are currently available a sufficient number of contiguous idle memory locations to serve the new call. The number of contiguous memory locations required varies with the number of parties involved on each call. A conventional two party connection may require six contiguous locations, a three party conference call requires eight contiguous locations, a four party conference call requires twelve contiguous locations, etc.

Since the number of memory locations required to serve a call varies, the Alles system requires "overhead" operations to sometimes relocate the unused and the used locations so that as many unused locations as are required by a connection may be contiguous to one another. This permits maximum flexibility to be achieved in allocating TSI memory locations to serve newly initiated calls.

Another characteristic of the Alles TSI is that the instructions provide limited functions suitable to a general purpose signal processor. This results in the need for many instructions to achieve a connection, six for a two party connection and so forth, as mentioned above. For a fixed system frame interval and a given instruction execution speed, only a fixed number of instructions can be executed per frame. So the requirement for many instructions per connection means that fewer simultaneous connections can be provided by the TSI.

From the above, it can be seen that although the Alles TSI represents an improvement over the conventional time slot driven RAM TSI, the use of a single accumulator for serving conference calls results in undesirable programming complexity. This complexity results in system overhead operations that decrease the throughput of the processor controlling the Alles TSI. Also, the need for many instructions per connection means that costly high speed designs are required to achieve a large number of simultaneous connections.

SUMMARY OF THE INVENTION

In accordance with the present invention, the above and other problems of the prior art TSIs are solved by the provision of a program controlled signal processor which is operated as a TSI to provide improved conferencing facilities, to increase processor throughput, and to require fewer programming restraints than does the Alles TSI. In the disclosed illustrative embodiment, the program controlled signal processor is configured as a special purpose pipeline processor that performs conventional time slot interchange functions. It also performs these functions, as does Alles, by permitting each interchange of a call signal between time slots to be effected with a specified signal gain or loss. It also provides improved and more flexible conferencing facilities.

The improved conferencing facilities comprise the use of a conference accumulator RAM having a plurality of memory locations each of which is assignable to a different conference call currently being served by the system. The summation and difference signals that are generated sequentially as the TSI instructions for a first conference call are executed during each time frame and are stored in the RAM memory location assigned to the call. Only one call signal can be stored in the assigned RAM location at any time for each call. The execution of the next TSI instruction for a call may generate a new signal that overwrites the prior signal stored in the RAM for that call. The last signal generated during a frame and written into the RAM remains stored within the assigned RAM location for the remainder of the frame. The call signals change during each successive time frame as new speech signals are received from the conferee parties and applied to the TSI.

A second location as well as remaining locations of the accumulator RAM are assigned to a second and any additional conference calls currently being served by the system. In this manner, a plurality of conference calls are served concurrently by the system with each call being assigned to a unique location within the accumulator RAM for the storage of the last sum signal generated for each call by the CPU of the TSI.

The provision of the accumulator RAM with its plurality of locations for the serving of a plurality of conference calls reduces the programming complexities of the TSI program store (the TSI memory) compared to that of Alles. This reduced complexity eliminates the requirement that the plurality of instructions associated with a single call be contiguous with one another within the program store. The plurality of instructions required to serve a call may be interspersed throughout the program store among the instructions for other calls. One or more instructions for a first conference call may be executed and the signal processing results of the last executed instruction stored in the associated accumulator RAM location. Instructions for other conference calls may then be executed and the resultant signals associated with these calls be stored in the appropriate assigned RAM locations. As subsequent locations of the program store are read out and executed, the remainder of the instructions for the first conference call may be executed and stored in the associated RAM location. These subsequent instructions can be executed, even though they require access to the last executed signal computation for the call, since the results of the computations remain stored in the RAM location assigned to the call.

This increased programming flexibility of the program store, which permits the plurality of instructions for a conference call to be randomly located throughout the program store, reduces processor overhead work time compared to that of Alles since the processor is not required periodically to relocate the used and unused locations so as to have as large a block as possible of contiguous unused memory locations. This results in a significant processor workload reduction and hence increased processor throughput.

The use of a special purpose pipeline processor permits a smaller set of more powerful program instructions to be used in implementing the TSI function for both conference and nonconference connections. The signal processor TSI of Alles is a general purpose type signal processor and hence requires a plurality of limited capability program instructions to effect each connection. Each instruction performs a small portion of the operations required to make a connection, and thus requiring more instructions to serve a given number of connections. The provision of the special purpose pipeline processor of the present invention allows simpler instructions, each of which specifies the signal source, the signal destination and any necessary gain or loss. The pipeline processor receives these commands, decodes them, and uses the appropriate hardware available within it to effect the specified signal exchange. The result is to allow a smaller number of instructions and hence a lower cost design to be used to achieve a given capability for simultaneous connections.

BRIEF DESCRIPTION OF THE DRAWINGS

The invention should become more apparent from the following detailed description when taken in conjunction with the accompanying drawings in which:

FIGS. 1 and 2, when arranged as shown in FIG. 3, disclose a system embodying the present invention;

FIGS. 7, 8, 9, and 10 disclose details of the program instructions executed by program store 136;

FIGS. 12 through 17 disclose the operation of the system in a flow chart format.

DETAILED DESCRIPTION

Figure 1:
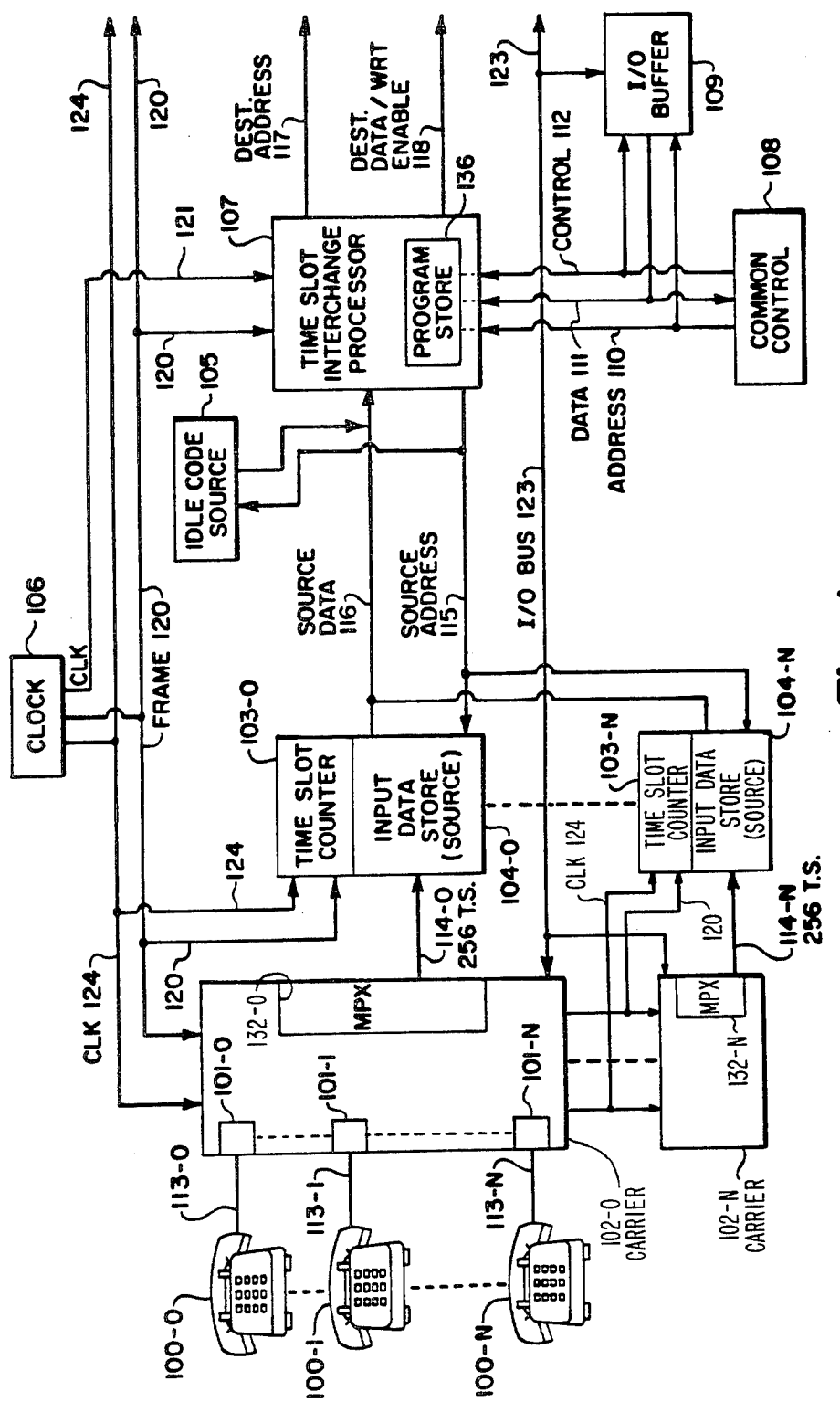

FIGS. 1 and 2, when arranged as shown in FIG. 3, disclose a time division switching system embodying the invention. Elements on FIGS. 1 and 2 are disclosed in what may be termed an "unfolded" configuration in which the flow of call information is from signal generating sources on the left, through the various disclosed system elements, to signal receiving elements shown on the right.

The system comprises a plurality of telephones 100, carriers 102, and a time slot interchanger (TSI). The TSI includes input data stores 104, a time slot interchanger processor 107, and output data stores 134. The system further includes common control 108 and I/O buffer 109. Each carrier 102 comprises port circuits 101, each of which is individual to a station 100 and to an assigned system time slot. Each carrier 102 further comprises a multiplexor 132 on FIG. 1 and a demultiplexor 133 on FIG. 2.

Multiplexor 132 receives PCM encoded "speech" signals from the port circuits in its carrier during each system time slot assigned to a port circuit currently serving a call. Element 132 multiplexes these signals together into a signal having a plurality of time slots, such as a 256 time slot signal. This multiplexed signal is applied over path 114-0 to input data store 104-0 (for carrier 102-0).

Demultiplexor 133 on carrier 102-0 of FIG. 2 receives a multiplexed signal having 256 time slot on path 119-0 from output data store 134-0. This signal is demultiplexed into separate PCM signals each of which is applied to its associated port circuit 101 during the associated time slot.

Telephones 100-0 through 100-n, and the carriers 102-0 through 102-n are shown on both the right and left side of FIGS. 1 and 2 in the unfolded mode. A call is served as call signal information generated at a station on the left is extended to the right via its associated port 101, multiplexor 132, input data store 104-0, through the time slot interchange processor 107, through output data store 134-0, through demultiplexor 133 on FIG. 2, through the port 101 serving the station to which the signal is directed, and over the associated path 113-0 to the receiving station.

The operation of the system is controlled by common control 108 which includes processor and memory facilities. Address, data and control signals are applied over paths 110, 111, and 112 by common control 108 to the time slot interchange processor 107 as well as to the I/O buffer 109. The I/O buffer 109 is connected via I/O bus 123 to carriers 102-0. This bus provides a path by which common control 108 and carriers 102 may exchange I/O information. In controlling the system operation, common control 108 scans the state of the various system elements and circuits via the I/O buffer 109 and I/O bus 123. It also uses these I/O facilities to effect various system functions and circuit operations, such as called station digit collection.

Let it be assumed that a connection is to be extended from station 100-0 on the left to station 100-1 on the right. This being the case, the system establishes a virtual connection in which the speech or other intelligence signals representing the subject matter of the call at station 100-0 are transmitted through the port circuit 101-0, multiplexor 132, input data store 104-0, time slot interchange processor 107, output data store 134-0, demultiplexor 133, port 101-1, to station 100-1. The establishment of this connection involves the steps of writing encoded PCM signals from the calling station 100-0 into an associated location of the input data store 104-0, extending the signal through the time slot interchange processor 107, and writing the extended signal into the location of the output data store 134-0 associated with station 100-1.

Multiplexor 132 receives PCM encoded call signals from the station 100-0 via port circuit 101-0 and multiplexes the received signal into an assigned one of the time slots of the 256 time slot signal on path 114-0 extending to input data store 104-0. Input data store 104-0 has 256 memory locations each of which is unique to and associated with each of the time slots on path 114-0. Each time slot is associated with one of the stations 100. Let it be assumed that the memory location within input data store 104-0 has a numerical suffix corresponding to each of the stations 100. In this case, the signal from station 100-0 is transmitted over path 114-0 in time slot 0 and written into location 0 of input data store 104-0 under control of address signals from time slot counter 103-0.

Time slot interchange processor 107 performs its virtual interconnecting function on each connection by reading call signals in specified locations of the input data store 104, by performing any required operations on the signals, such as a gain or loss insertion, and by then writing a resultant signal into the memory location of the output data store 134 associated with the station to which the call signal is directed. Time slot interchange processor 107 includes a program store memory 136 which contains the program instructions required to control the operation of processor 107. Memory 136 is updated periodically by common control 108 as the common control dynamically determines the tasks that are to be performed by the system in the serving of each call.

The instructions written by common control 108 into program store 136 specify each virtual interconnection that is to be effected. The information in each instruction specifies the address of the input data store 104-0 from which the call signal is to be read, the address of the output data store 134-0 into which the signal is to be written, the signal gain or loss insertion, as well as OP code information indicating whether the call is of the conference or nonconference type. For a nonconference call that involves no gain or loss insertion, the program store instruction merely specifies the address of the input data store from which the signal is to be read and the address of the output data store into which the signal is to be written. The output data store 134-0 is periodically read out by time slot counter 135-0, formed into a 256 time slot signal on path 119-0 and applied to demultiplexor 133 of carrier 102-0. Element 133 demultiplexes the received signal and applies the PCM signal from each time slot to its associated port 101-0 and station 100-0. For the present call, the called station information is assumed to be in location 1 of the output data store 134-0, it is transmitted over path 119-0 in time slot 1, it is applied to demultiplexor 133 where it is demultiplexed and is extended to port circuit 101-1 for transmission over path 113-1 to station 100-1.

The TSI processor 107 effectively performs a space switching function on its input in that it can execute any program store instruction upon any one of the plurality of 256 time slot streams incoming on a path 114 into the plurality of input data stores 104. The TSI processor 107 selectively accesses a selected location in a selected data store by applying appropriate "source" address information to path 115. It receives call information, termed source data, read out of the selected data store over path 116. This incoming source data is received by the TSI processor 107, modified as required, and written as destination data into a selected location of a selected output data store 134.

On its output side, the TSI processor 107 performs a space switching function in which path 118 extends call information to a selected location of a selected output data store 134-0. The TSI processor 107 effects this operation by applying a "destination" address to path 117 and by concurrently extending the call information that is to be written into the addressed store over path 118. Each output data store 134 is read out once every time frame, the read out information in each store location is inserted into the appropriate time slot of the 256 time slot data stream on a path 119 and is extended to the demultiplexor of its associated carrier.

Idle code source element 105 is an addressable memory that supplies a bit pattern representing 0 volts when addressed over path 115 by the TSI processor 107. It is used to write the 0 volt pattern into output data store locations associated with idle stations. The function of this element is subsequently described in further detail.

Figure 4:
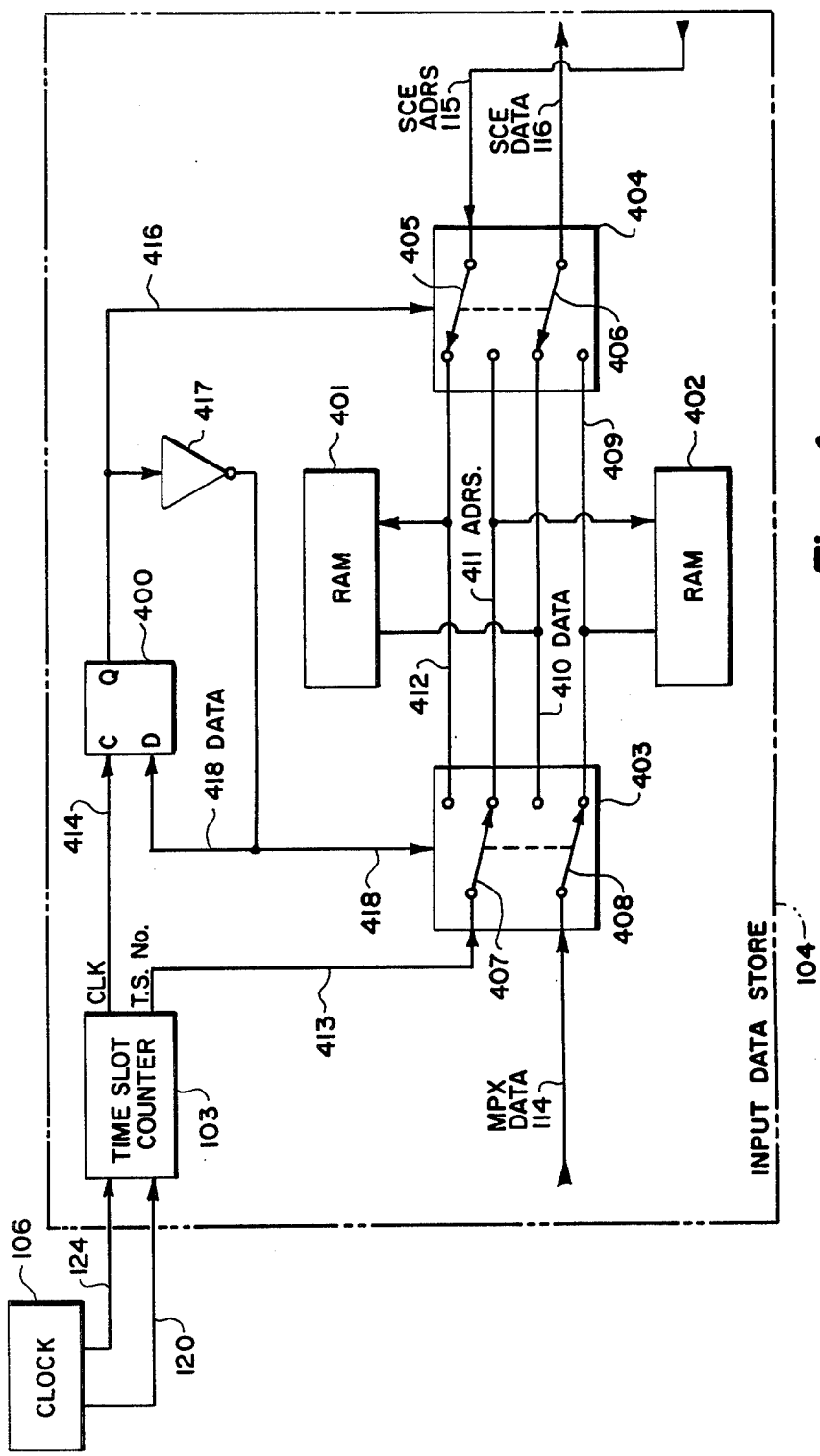
FIG. 4 discloses the details of the input data store.

Detailed Description FIG. 4

FIG. 4 discloses further details of an input data store such as store 104-0. The input stores are of the alternating type, as shown in Alles, in that they each comprise two RAMs 401 and 402 which alternate functions on successive system time frames insofar as concerns the reception of data from a carrier 102 and the transmission of data to the TSI processor 107. This alternating function is controlled by electronic switches 403 and 404. The position of these switches remains fixed for the duration of a time frame, and the switch position determines the function performed by each RAM for the frame duration.

Clock 106 generates and applies a beginning of frame pulse to path 120 and a time slot clock signal to path 124. These signals are applied to time slot counter 103 which applies binary coded time slot signals to path 413 as well as a frame pulse to path 414. The time slot signals on path 413 are used as address signals for writing PCM call data received on path 114 into the RAM 401 or 402.

Multiplexed call data from a carrier, such as carrier 102-0, is applied for the duration of a time frame over path 114 to switch 403 of the input data store. Call data received during the immediate preceding frame is extended from the input data store to TSI processor 107 over path 116 from switch 404. With the "contacts" of switches 403 and 404 positioned as shown on FIG. 4, PCM call data from a carrier on path 114 is extended through contacts 408 to the data input of RAM 402 via path 409. This information is written into the RAM under control of the address information applied to the RAM from time slot counter 103 over path 413, contacts 407, and path 411. Time slot counter 103 applies binary coded time slot signals as addressing information to RAM 402 at this time so that the call data received on path 114 during each system time slot is written into the RAM 402 location associated with the time slot.

With the "contacts" of switch 404 in the position shown on FIG. 4, TSI processor 107 applies address and control information over path 115, contacts 405, and path 412 to the address input of RAM 401. RAM 401 reads out the contents of the addressed location and applies the read out information over path 410, contacts 406, and path 116, to TSI processor 107. By this means, TSI processor 107 operates under control of its program store 136, reads out PCM data from RAM 401, and performs the specified call processing operations on the data it receives from the input data store.

The "contacts" of switches 403 and 404 are moved to their other position at the end of a frame so that the data received on path 114 during this next frame is read into RAM 401 under control of address signals generated by time slot counter 103 and applied to the address input of the RAM on path 412. Similarly, during this next frame, TSI processor 107 addresses RAM 402 via path 115 and reads out the call data received by the input data store on the preceding frame.

Each frame pulse on path 414 from time slot counter 103 is applied as a clock signal to flip-flop 400. The Q output of the flip-flop is connected over path 416 to the control input of switch 404 as well as to inverter 417 which, in turn, is connected via path 418 to the control input of switch 403 as well as to the D input of flip-flop 400. Inverter 417 applies a signal to the D input that is the inverse of the signal on the Q output of the flip-flop.

By this means, each frame pulse on path 414 clocks the signal on the D input of the flip-flop to the Q output. This causes the polarity of the potentials on paths 416 and 418 to alternate and, in turn, alternate the state of switches 403 and 404. This reverses the functions of RAM 401 and 402 each frame.

From the above, it may be seen that the switches 403 and 404 remain fixed for a frame duration so that one of RAMs 401 or 402 is then written with the PCM information received from an associated carrier on path 114 while the other RAM is read out by TSI processor 107 with the read out call information being that that was received by the input data store during the immediately preceding frame. Subsequently, at the end of the current frame, a new frame pulse is received on path 414, the contacts of switches 403 and 404 change position, and the functions of the RAMs 401 and 402 alternate. This permits new call information to be made available to the TSI processor from the RAM that was just written into. It also permits the RAM that was just read out by the TSI processor 107 to be available for the writing of new PCM call information.

There are two reasons that necessitate the use of alternating each RAM in an input data store. First, in order to simplify the programming of the TSI program store 136, it is necessary when two or more program store instructions for a call sequentially access an input data store location during a single time frame that the same call information be returned to the TSI processor for each instruction. This would not be the case if a single RAM was used in each data store since new call information could be written into the RAM location at any time. It is necessary that the contents of an input data store location remain unaltered by new incoming data for the duration of a frame since for conference connections, as subsequently described, the same memory location of an input store is used by the TSI processor a plurality of times. It is used a first time to form a sum signal representing the speech of all conferees. It is used a second time to form a difference signal that is transmitted back to each conferee. Because of the storage requirement of this PCM information for the duration of a frame and the fact that the TSI program instructions can occur sequentially over the entirety of a frame duration, the use of alternating RAMs in the data store simplifies the programming of the program store 110.

The use of alternating RAMs permits one RAM to collect new PCM data during a time frame while the TSI executes its read operation on the other RAM during the same frame. The time ordering of call information into multiple time slots is maintained by this expedient since multiple time slots are switched as a unit when the RAMs alternate function. The preservation of the time ordered information within a store facilitates the simplicity of the program store programming and eliminates constraints such as a mandatory relationship between the TSI instruction placement and the time slot numbers referenced by the instruction.

Figure 5:
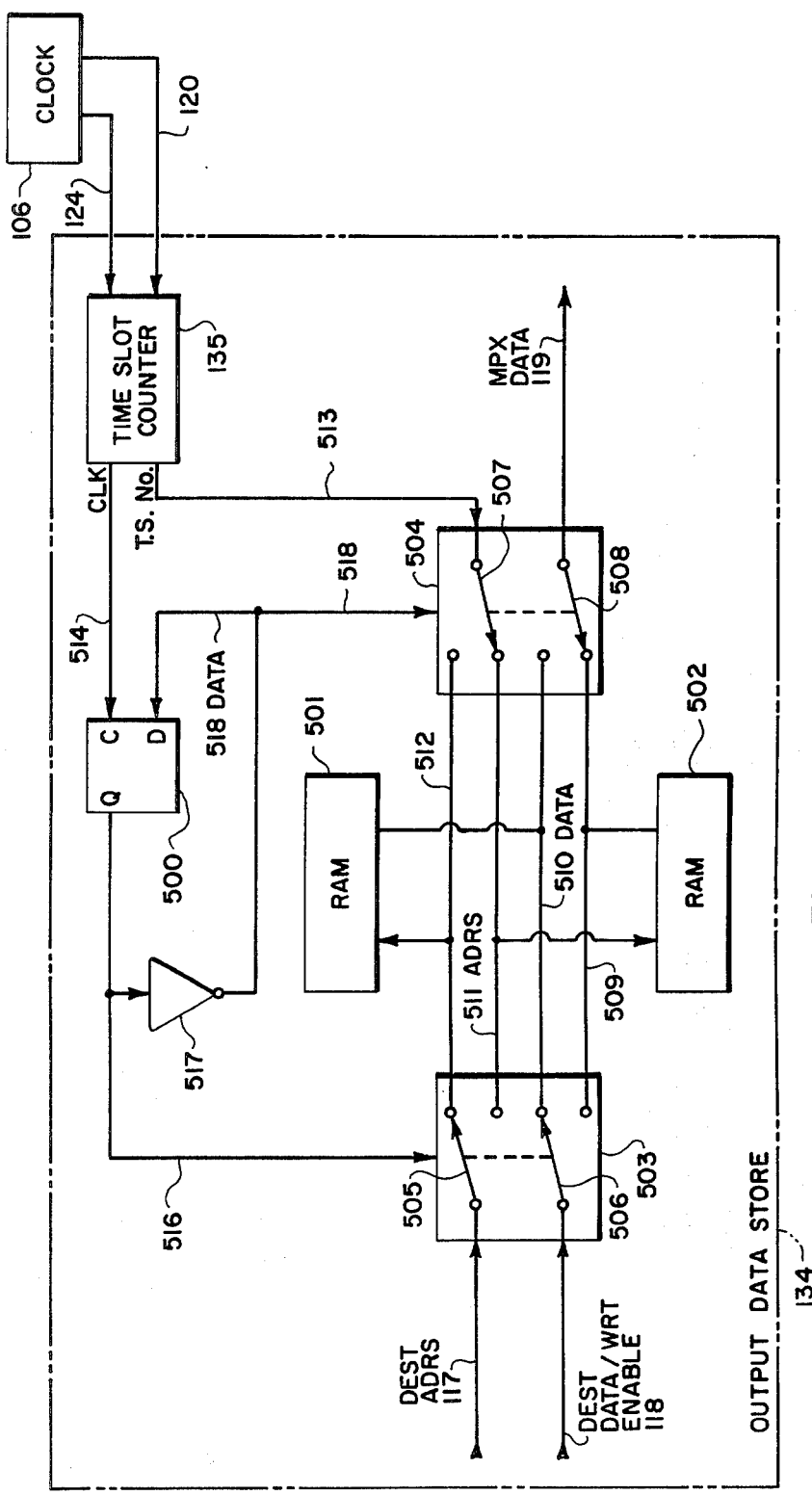
FIG. 5 discloses the details of the output data store.

Detailed Description FIG. 5

FIG. 5 discloses further details of an output data store such as store 134-0. The output data stores are structurally comparable to the input data stores of FIG. 4. The output data store comprises RAMs 501 and 502, switches 503 and 504, together with control circuitry comprising inverter 517, flip-flop 500, and time slot counter 135. The control circuitry switches the "contacts" of electronic switches 503 and 504 at the end of each time frame so that the functions of each RAM alternate can remain fixed for the duration of the next frame. In the switch positions shown on FIG. 5, RAM 501 is written with the "destination" information from TSI processor 107. Destination address information is applied by processor 107 to RAM 501 via path 117, contacts 505, and path 512. The destination data to be written is applied by the processor over path 118, contacts 506, and path 510. During this same frame, RAM 502 receives address information over path 513, contacts 507, path 511 from time slot counter 135 and reads out the contents of its addressed locations. The read out call information is extended over path 509, contacts 508, and path 119, to the demultiplexor 133 of the carrier associated with the output data store.

Upon the occurrence of the next frame, the contacts of switches 503 and 504 change position so that the functions of RAMs 501 and 502 are reversed. At this time, RAM 502 is written with new call information from TSI processor 107 and RAM 501 is read out by time slot counter 135 with the read out call information being extended over path 119 to the demultiplexor of the carrier associated with the output data store.

Clock 106 generates the signals required to cause counter 135 to generate and apply binary coded time slot signals as addressing information to path 513 as well as a frame signal to path 514. In a manner similar to that described for FIG. 4, the frame signal on path 514 switches the state of flip-flop 500 and, in turn, the polarity of the signals applied to paths 516 and 518. This causes the positions of the contacts of switches 503 and 504 to move to their alternate position.

Time slot counter 135 is advanced with respect to the time slot circuitry of its associated carrier 102. This is done in order to compensate for the time delay involved in transmitting call information from the output data store to the carrier, demultiplexing it within the carrier, and gating it to the correct port circuit during the occurrence of the system time slot assigned to the port circuit.

If the time slot counter of the output data store operated in coincident synchronism with that of the carrier, the information read out of the output data store and applied to the demultiplexor at the receiving carrier would not arrive at the receiving port circuit during the occurrence of the system time slot assigned to the port circuit. This being the case, the received information would be lost or applied to the wrong port circuit. For the same reasons, the counter 103 of the input data store is somewhat delayed with respect to the timing circuitry of its carrier 102.

Figure 6:
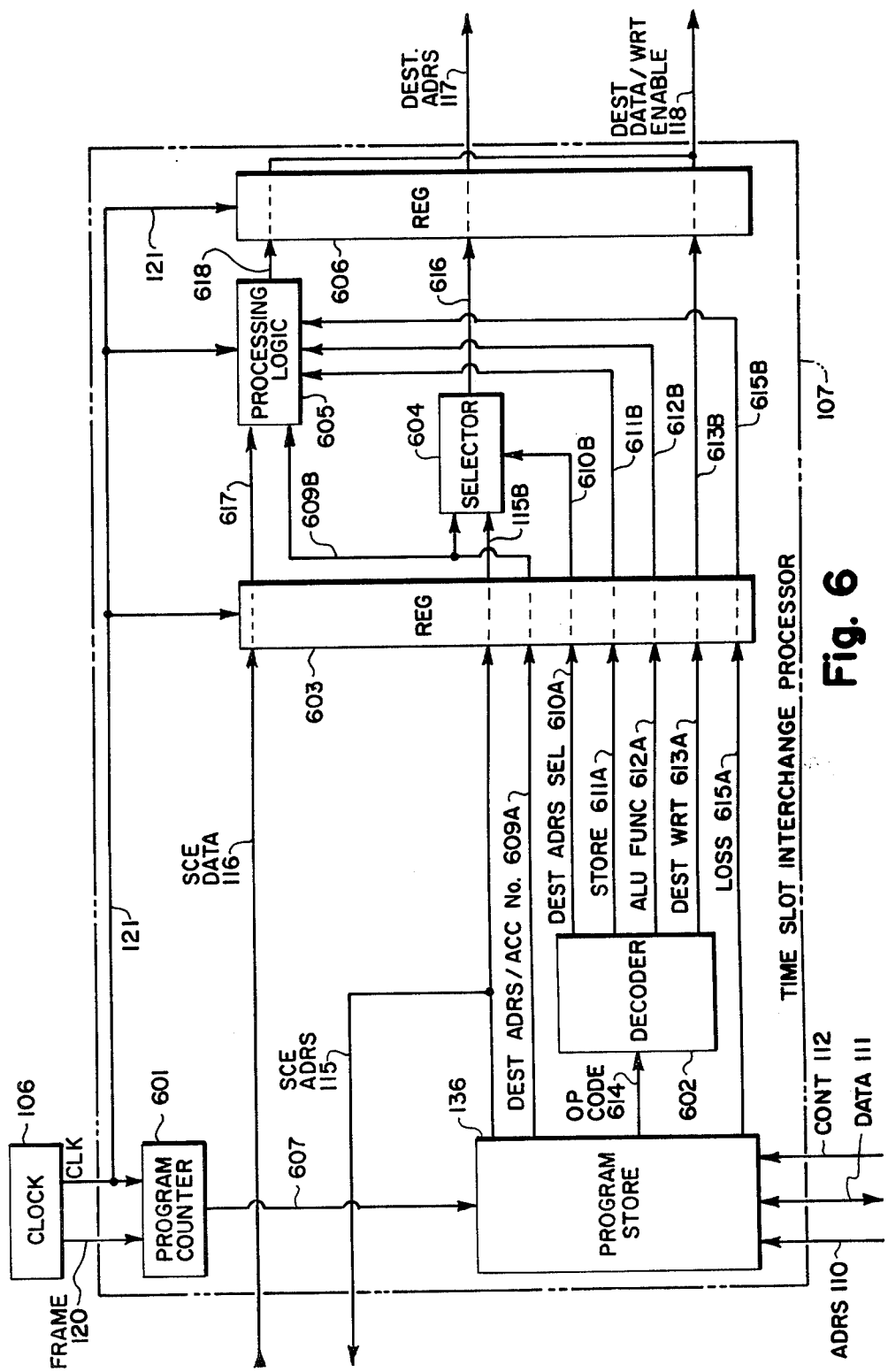
FIG. 6 discloses the details of the time slot interchange processor 107.

Detailed Description FIG. 6

FIG. 6 discloses further details of TSI processor 107 of FIG. 1. The major elements comprise program store 136, decoder 602, register 603, selector 604, processing logic 605, register 606, clock 106 and program counter 601. The circuit is controlled in its operation by instructions stored in program store 136. These instructions are written into the program store and continuously updated by common control 108 via paths 110, 111, and 112.

Program store 136 instructions are read out under control of binary coded address information from program counter 601. Each instruction causes source data in an addressed location of input data store 104 to be read out and entered into register 603. From there it is applied to processing logic 605 which performs any computations specified by the instruction and passes the resultant information to register 606. The information in register 606 is written as destination data into output data store 134 of FIG. 1 over paths 118 and 117 of FIG. 6. In the transfer of information through TSI processor 107 from input data store 104 to output store 134, the TSI processor performs the required time slot interchange function as well as any arithmetic operations specified by the controlling instruction.

System clock 106 controls the timing of the TSI processor as well as the timing of the circuitry of the other system elements such as the port carriers 102 and data stores 104 and 134. The overall system may be assumed to operate at the conventional 8 kilohertz sampling rate. Therefore clock 106 operates at the frequency of 4,096,000 Hz (4.096 MHz) and applies a signal to path 121 to generate 512 TSI time slots 8000 times a second. This characterizes a frame duration of 125 microseconds. Output 120 of clock 106 receives a frame pulse once every 125 microseconds to keep the various system clocks including program counter 601 in synchronism and to indicate the beginning of each new frame interval.

The system of FIGS. 1 and 2 may be assumed to have 256 time slots per frame, as discussed. Program store 136 may be assumed to have 512 addressable locations designated 0 to 511. The TSI processor 107 has the capability of addressing and reading out any location of any input data store during a system time slot, for transferring the readout information through the TSI and by writing the transferred information into any specified location of any output data store 134. Generally, two instructions are required in the serving of nonconference two party calls. These 512 program store instructions permit the serving of a maximum of 256 calls concurrently.

Program counter 601 operates under control of system clock 106. It is reset to its 0 position at the beginning of each frame by a pulse on path 120. It is advanced through its positions 0 to 511 during each frame by the 4.096 MHz clock pulses on path 121. The counter output on path 607 comprises binary coded signals that are applied as address information to program store 136 which operates in synchronism with counter 601 and advances through positions 0 to 511.

Each TSI program store instruction interval is the frame interval of 125 microseconds divided by 512 or 244 nanoseconds. This instruction interval may be divided into a first and a second segment. In the first segment, program store 136 retrieves the instruction addressed by the program counter 601 and makes the contents of that instruction available to the other parts of the TSI processor 107. In the second segment, the program store and common control communicate with one another to perform various required system functions including that of writing a new instruction into the currently addressed program store location. By this means, common control 108 and the program store 136 continuously communicate with one another so that the program store is dynamically updated with new instructions.

FIG. 7 illustrates the instruction format of program store 136. As shown, from left to right, the instruction comprises a 4 bit OP code field, a 4 bit loss field, an 11 bit destination address field and an 11 bit source address field. The destination address field includes an 8 bit accumulator number subfield.

The OP code field specifies the function to be performed by the instruction. The loss field represents the attenuation or gain that is to be applied to the received signal. The destination address field instructs the TSI to apply its output information to a specified location of a specified output data store 134. The source address field indicates the location of the input data store 104 from which the call information that is to be operated upon is to be read. The accumulator number subfield of the destination address field is used only for conference calls and, as subsequently described, specifies an accumulator memory location within processing logic 605 that is to be used in serving each conference call. The function of this element is described in further detail in connection with FIG. 11.

FIG. 8 discloses the two instructions required to serve a typical nonconference, two party, call involving stations designated A and B. The OP code SD (source to destination) specifies that source information of station A is to be transmitted from the source address location of the input data store to a destination address location of station B in an output data store. The loss field value of 0 for this call indicates that the amplitude of the received source data is not to be altered. The first instruction of FIG. 8 causes the TSI processor to read the source data in location A of the input data store and to transfer it as destination data to address B of the output data store with the signal amplitude of the data being unchanged. The second instruction of FIG. 8 performs a similar operation in reading the source data for address B in an input data store and for transferring it to location A of the output data store.

The following describes in further detail the operation of the system of FIG. 6 in executing the first instruction shown in FIG. 8. Let it be assumed in connection with this description that the described instruction is located in address 2 of program store 136.

Location 2 of program store 136 is read out and the source address for station A is applied to path 115 extending to the input data store 104 of FIG. 1. This address information accesses the memory location of the data store 104 associated with station A and causes the contents of the address location to be read out and applied to source data path 116 extending to the input side of register 603. This information is entered into register 603 by the next TSI clock pulse on path 121.

At the same time that program store 136 reads out and applies source address information to path 115, it also reads out and applies: the destination address contained in the instruction to path 609A, the OP code to path 614 and the loss information to path 615A. The OP code is applied to decoder 602 which generates and applies to register 603 the information indicated on paths 610A, 611A, 612A, and 613A. The information on path 610A represents a destination address select signal whose function is subsequently described in detail. The information on path 611A is a store signal for processing logic 605. The information on path 612A is an ALU function signal for processing logic 605. The information on path 613A is a destination write signal for register 606. The functions performed by these signals are subsequently described in detail.

The information now applied to the input of register 603 by the program store on paths 115 and 609A, by the decoder 602 on paths 610A–613A, and by the program store on path 615A, is entered into the register upon the occurrence of the next TSI clock pulse on path 121. This pulse also advances program counter 601 to position 3 so that the instruction in position 3 of store 136 is read out while the processor operates upon the data now in register 603.

The source data now in register 603 is applied over path 617 to processing logic element 605. The registered destination address is applied by path 609B to selector 604 as well as processing logic 605. The registered source address is applied via path 115B to the lower input of selector 604. The registered information received on paths 611A, 612A, and 615A is extended over paths 611B, 612B, and 615B to processing logic 605. The signal on path 613B is extended to register 606 as a write enable signal whose function is later described.

Selector 604 operates under control of the signal on path 610B to connect its output 616 to either its input 609B or its input 115B. This causes the address information on path 616 to be either the destination address on path 609B or the source address on path 115B. For two party calls of the type now described, the destination address on path 616 is to be supplied by the destination address readout of the program store on path 609A and extended by register 603 via path 609B to the upper input of selector 604. Therefore, the signal now on path 610B causes the selector 604 to connect its output 616 with its upper input on path 609B. Register 606 receives a destination write signal from register 603 via path 613B.

The signals on paths 611B, 612B, and 615B extending to processing logic 605 control that element so that it performs the required operation on the source data it receives at this time on path 617. As already mentioned, the only function of processing logic 605 for this instruction is to transfer the source data it receives on path 617 to its output on path 618 which extends to the input of register 606. This transfer is effected by element 605 with a loss value of 0. At this time, register 606 concurrently receives source data on path 618, the destination address on path 616, and a write signal on path 613B.

The next clock signal on path 121 loads the source data on path 618 and the destination address on path 616 into register 606. This same clock pulse advances the program control to its position 4 and causes it to read out from the input data store the source data specified by the instruction in position 4. The information for the instruction in position 3 of the program store is entered into the register 603 at the same time that the processed information on path 618 and destination address on path 616 for the instruction in store location 2 is written into register 606.

The information now in register 606 for instruction 2 causes it to apply destination data over path 118 to the output data store 134 at the location specified by the destination address on path 117. This destination data is then written into a specified data store location by the write signal on path 118.

The TSI processor of FIG. 6 operates in this manner as successive clock pulses on path 121 are received. Each clock pulse advances program counter 601 to address the next location of program store 136 and read out the signals comprising the next instruction. When a currently addressed instruction in the program store is being read out, the information in register 603 for the immediately preceding instruction is being applied to the processing logic 605 and register 606. At the same time, register 606 is applying to the output data store the information received by it for the next earlier instruction. In this manner, the circuitry of FIG. 6 concurrently performs three separate functions. The first is to read out a new location of the input data store, the second is to process information for the preceding instruction and the third is to apply destination data to the output data store for an earlier executed instruction.

Figure 11:
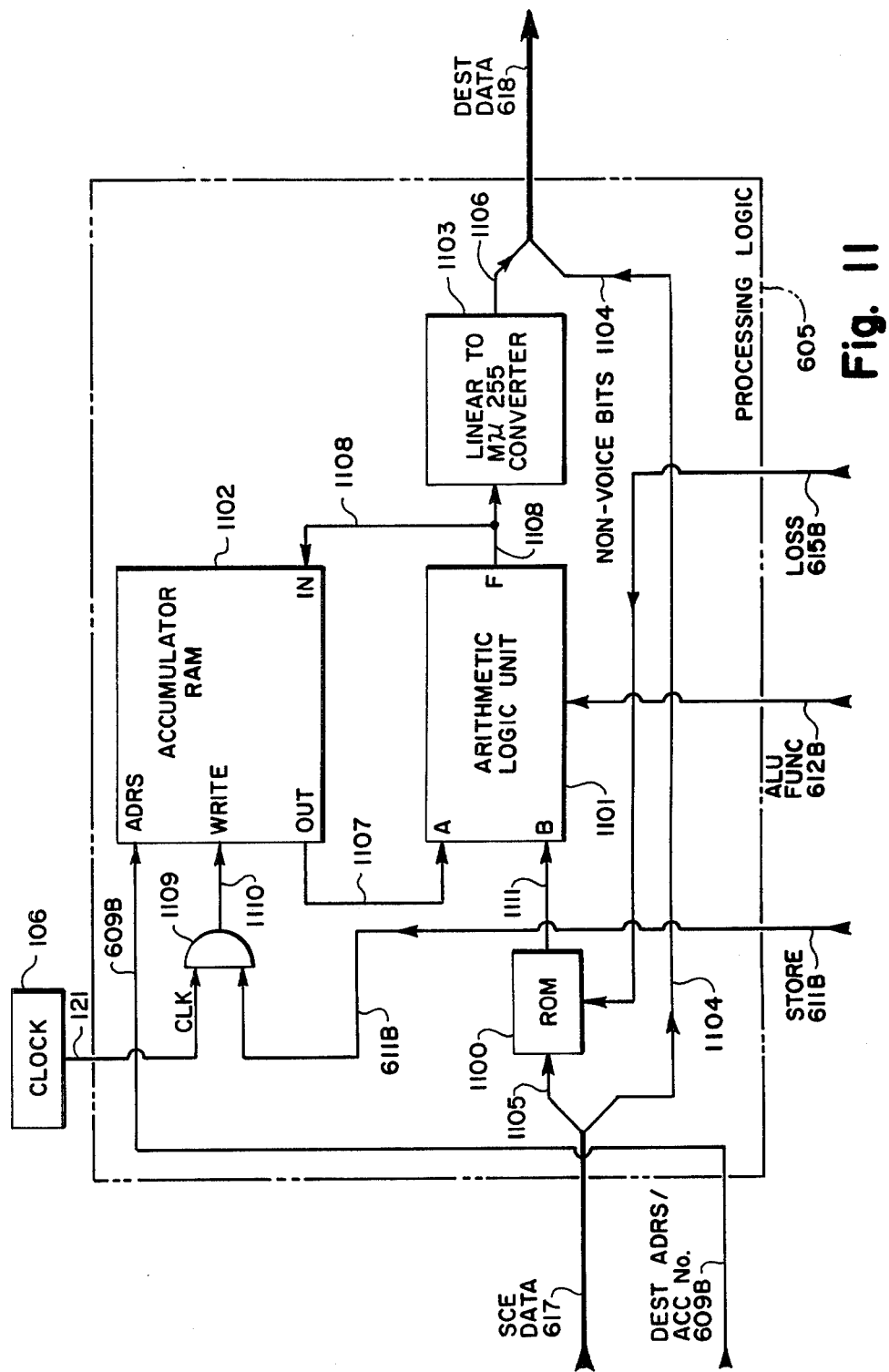
FIG. 11 discloses the details of the processing logic 605.
Figure 12:
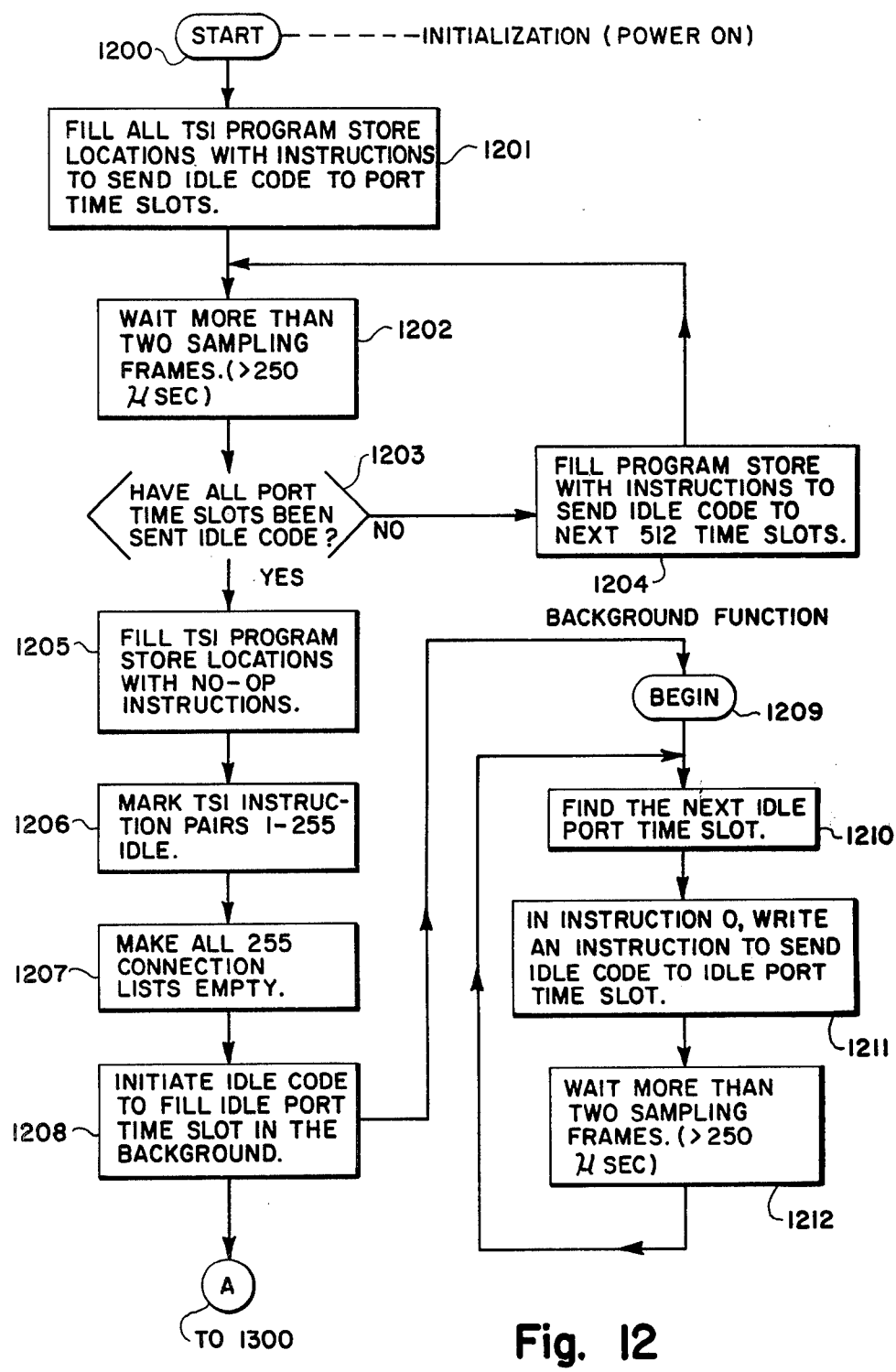
Figure 13:
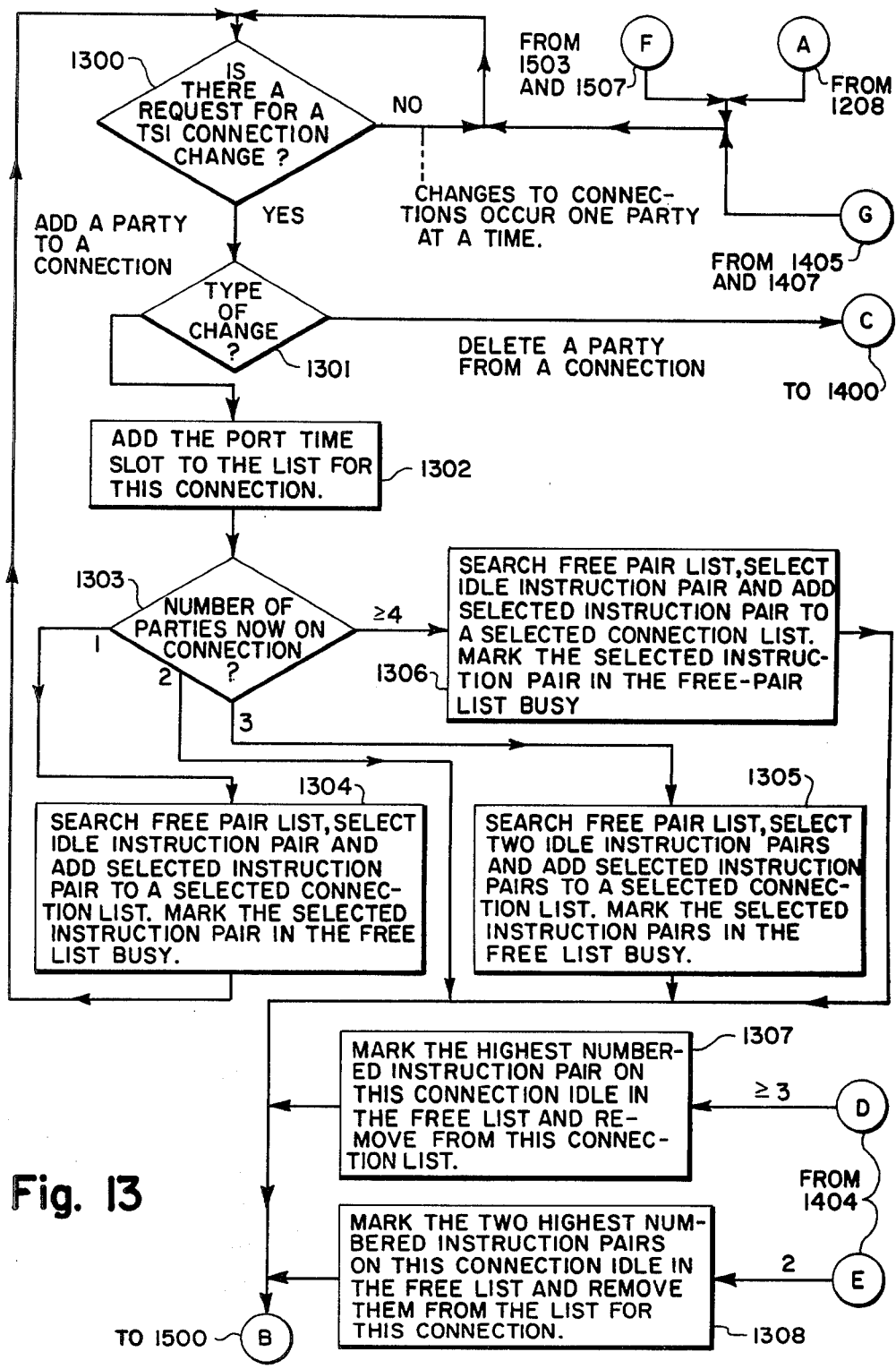
Figure 14:
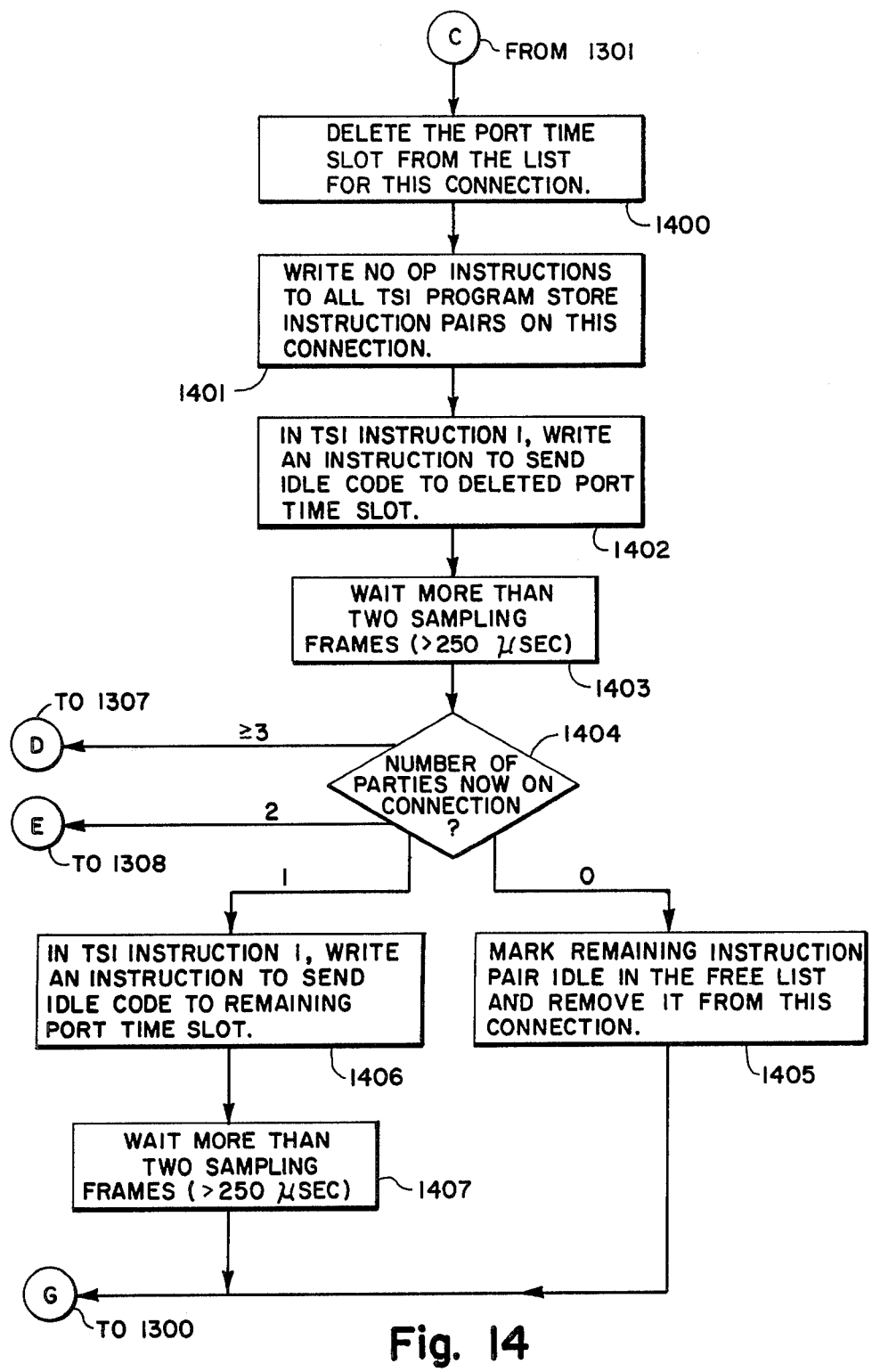

Detailed Description FIG. 11

FIG. 11 illustrates the elements comprising processing logic 605 on FIG. 6. These elements comprise a Read Only Memory (ROM) 1100, Arithmetic Logic Unit (ALU) 1101, accumulator (Random Access Memory) RAM 1102, and a linear to MU255 converter 1103. The circuitry of FIG. 11 receives source data on path 617, it performs the specified ALU function on this data and applies it to output lead 1106 and 618 as destination data that is written into the output data store. Any "non-voice bits" on path 617 that do not require processing can be extended via path 1104 to the output of element 605 on path 618.

In placing a two party call, the SD (Source to Destination) instructions shown in FIG. 8 are used. For the presently described call instructions of FIG. 8 in which the call information from station A is extended to address B with a loss of 0, the source data from station A is applied by path 617 to the input of ROM 1100. ROM 1100 also receives a signal on path 615B specifying the loss value of 0. The ROM comprises a MU255 to linear converter and the signals on paths 1105 and 615B effectively comprise address signals for the ROM so that it can perform its conversion function with the specified insertion gain or loss. With an indicated loss value of 0 on path 615B, the ROM receives MU255 source data on path 1105 and converts it to linear data on path 1111 which extends to the B input of the ALU. The ALU is capable of performing various arithmetic and logical functions specified by control signals applied to path 612B. The signal on path 612B at this time instructs the ALU to extend the signals received on its B input to its F output. It thus performs the $F = B$ function. The call signals on the F output are extended over path 1108 to the input of converter 1103. Converter 1103 converts this call information from linear back to a MU255 form and applies it to path 1106 which becomes path 618. From there, the call data is written into an output data store 134 under control of destination address signals on path 117 on FIGS. 1 and 2.

The preceding paragraphs have described how the circuitry of FIGS. 6 and 11 reads source information of station A into input data store 104, passes it through TSI processor 107 including processing logic 605, and writes it as destination data output data store 134 under control of destination address information on path 117. The output data store is subsequently readout under control of the system clock 106 and time slot counter 135. The read out information is extended over path 119 to carrier 102 where it is demultiplexed and applied via a port circuit to station B, which is station 100-1 for the currently described call. The system functions to transmit call information from station B (100-1) on the left to station A (100-0) on the right in an analogous manner.

The following describes the function of the circuitry of FIGS. 6 and 11 in processing a three party conference call involving stations A, B, and C. Program store 136 instructions for serving this call are illustrated in FIG. 10. The first instruction, SA (Source to Accumulator), takes the source data signals from station A and writes them into an assigned location (location 29 for the present example) of the accumulator RAM 1102. The second instruction, SPA (Source Plus Accumulator to Accumulator), causes the ALU 1101 to receive the source data speech signals from station B, add them to data for station A currently stored in the accumulator location 29 and to put the resultant sum back into the location 29 of the accumulator. The third instruction, SPA, causes the ALU to receive source data signals from station C and add it to the sum of the signals for stations A and B already in the accumulator. Instruction four, MSAD (Minus Source Plus Accumulator to Destination), causes the ALU to receive the signals for station A on path 1111, subtract them from the sum $A + B + C$ in RAM 1102 and to pass the result $(B + C)$ to the destination output path 618. This difference signal of $B + C$ is written into an output data store 134 and transmitted to station A. As a result of this operation, station A receives only the speech signals for stations B and C. In this manner each conferee receives only the speech signals of the other conferees.

On instruction 1 of FIG. 10, the source data signals from station A are applied to path 617 and extended through ROM 1100 over path 1111 to the B input of the ALU. The ALU extends the station A signals to its F output over path 1108 to the input of the accumulator RAM 1102. The 8 bit accumulator number field of the destination address field of FIG. 7 is used as accumulator address information at this time and applied to RAM 1102 over path 609B. This address assigns a unique RAM location (such as 29) to serve this conference call. Lead 611B receives a store signal at this time which is applied to AND gate 1109. The next clock pulse on path 121 and the upper input of the AND gate generates a write signal on path 1110 and causes the RAM to write the source data from station A on path 1108 into RAM location 29 as specified by the address information on path 609B. Although the call information for station A on path 1108 is extended through converter 1103 to path 618, it is not written into register 606 because a write signal is not applied at this time to path 613B of FIG. 6.

In instruction 2 of FIG. 10, the ALU receives the call information for station B on its B input. The signals now on path 612B instruct the ALU to perform the function $F = A + B$. In performing this function, the ALU receives the call signals from station B on its B input, it receives the call signals for station A stored in the RAM 1102 on its A input, it adds these two signals and applies the resultant sum of $A + B$ to the input of RAM 1102. This sum is then written into addressed location 29 of the RAM upon the coincidence of a store signal on path 611B and a clock signal on path 121. In performing this $F = A + B$ operation, the RAM reads out the call information for station A under control of address signals on path 609B. It also writes the resultant sum of stations A and B into the same location 29 specified by the address signals on path 609B.

The ALU and the circuitry of FIG. 11 operate in a similar manner for instruction three of FIG. 10. Specifically, the call signals for station C are received at the B input of the ALU, the sum of the signals for stations $A + B$ are received at the A input, the ALU adds these signals together to form the sum of $A + B + C$ at its F output. This resultant sum is written back into the same location 29 of RAM 1102 under control of the address information on path 609B and a write signal on path 1110. On instruction four of FIG. 10, the ALU 1101 receives the source data call signals for station A on its B input and receives the sum signals for stations A+B+C on its A input. The control signal on path 612B at this time instructs the ALU to subtract the signal on input B from the signal on input A and to apply the resultant signal to the F output. This causes the sum of stations B+C to appear at the output, to be extended through converter 1103, and to be written as destination data in register 606. From there, it is written into output data store 134 and extended to a party A at station A who then hears only the speech signals for stations B and C in the receiver of his/her subset. For this instruction, store signal 611B will be inactive so RAM location 29 is not changed, while destination write signal 613B of FIG. 6 will be active so that the output data store 134 will be written.

Instructions five and six of FIG. 10 cause the ALU to perform comparable subtraction operations on the source data from stations B and C and the sum signals A+B+C in RAM 1102 so that stations B and C only receive the speech signals for the other two conferee stations.

Program store 136 instructions required to serve a call need not be contiguous to one another. The reason for this is that the provision of RAM 1102 to serve conference calls effectively provides a unique register for each currently served conference call. Thus, in serving a first conference call, one or more of the required instructions may be executed and the results stored in the assigned accumulator register. Instructions for other conference calls may then be executed and the results stored in the accumulator registers assigned to these other calls. The results stored in the accumulator register for the first call are not over written as these other calls are served. The remainder of the required instructions for the first call may be subsequently executed with assurance that the contents of the assigned accumulator register are valid and have not been over written with data from other calls. This feature represents a significant advance over Alles and results in simpler programming since the plurality of instructions required for a call need not be contiguous within program store 136. Because of this, the common control 108 is relieved of the burden of periodically rearranging the instructions in program store 136 in order to provide sizable blocks of unused memory locations for the serving of newly arrived conference calls requiring contiguous memory locations as taught by Alles.

Detailed Description FIGS. 12 through 17

FIGS. 12 through 17 disclose further details of the manner in which the system processes information to establish and serve call connections. Element 1200 effects a system initialization procedure when the power is turned on. Element 1201 fills all locations of TSI program store 136 with an idle code instruction of the type shown in FIG. 9. This instruction writes an idle signal in each location of output data store 134. Elements 1202, 1203, and 1204 cause the idle code signal to be written in all time slots of all output data stores, and into both of the alternating RAMs in the output data stores.

Element 1205 fills the TSI program store 136 with no-op instructions. Element 1206 marks all of the TSI instruction pairs 1 through 255 of FIG. 16 as being idle. The instruction pairs are designated as being in locations 1 through 255 of the FIG. 16 list. The contents of the associated memory location are written to be either busy or idle and each location is associated with a unique pair of TSI program store instruction locations. Thus, the first location is associated with instructions 2 and 3; location 255 is associated with instructions 510 and 511. Instructions 0 and 1 are not shown since they are exclusively used to send idle code commands of the type shown in FIG. 9. Instruction pairs are used in this example since all connections, whether two party or conference, require an even number of TSI instructions.

Element 1207 makes all of the 255 connection lists, of the type shown in FIG. 17, empty and available for the assignment of calls. Each list can serve a call and stores information indicating the identity of the parties connected on the call as well as the identity of the instruction pairs in the list of FIG. 16 assigned to serve the call. The identity of the connected parties is expressed in terms of time slots since each port, and hence each station, is permanently associated with a unique time slot. The number of each connection list 1 through 255 also specifies the location of RAM 1102 that is used if the served call is of the conference type.

Element 1208 initiates the procedures described in elements 1209 through 1212. These are background procedures which continuously identify idle system time slots and write the FIG. 9 idle code instruction in the associated TSI program store location which in turn, writes an idle signal indication in the associated output data store location.

Element 1300 begins the process in which calls are established or broken down. In the establishment of calls, it should be noted that the changes to call connections occur only one party at a time regardless of the number of parties on the call or of the type of call. The following paragraphs first describe a two party nonconference type call involving parties A and B. This call is assumed to use connection list 1 on FIG. 17 and the instruction pair 4/5 as shown in FIG. 16.

Element 1300 detects the initiation of a request for a TSI connection change. Element 1301 determines that party A is to be added to the connection. As part of the overall function of common control 108, it detects that parties A and B are involved on the call and selects connection list 1 and instruction pair 4/5 to serve the call. Element 1302 writes the assigned port time slot for party A in the connection list 1 of FIG. 17.

Element 1303 determines that there is now one party on the call and advances the process to element 1304. Element 1304 searches the free pair list of FIG. 16 and selects free instruction pair 4/5 to serve the call. It writes this selected instruction pair into connection list 1 of FIG. 17 and marks the instruction pair 4/5 busy on FIG. 16.

Element 1300 determines that a second TSI connection change is required and element 1301 determines that party B must be added to the connection. Element 1302 writes the assigned port time slot for party B into connection list 1. Element 1303 determines that there are now two parties on the connection and advances the process to element B on FIG. 15.

Element 1500 determines that there are now two parties on the call and element 1501 selects the losses that are to be used on this connection through the TSI. Element 1502 writes an SD instruction of the type shown in FIG. 8 in the lower numbered one of the instruction pair for this connection. For this call, the SD instruction is now written into location 4 of the TSI program store. Element 1503 writes the appropriate SD instruction into the higher numbered one of the selected instruction pair. For this call, the SD instruction is now written in program store location 5.

Figure 15:
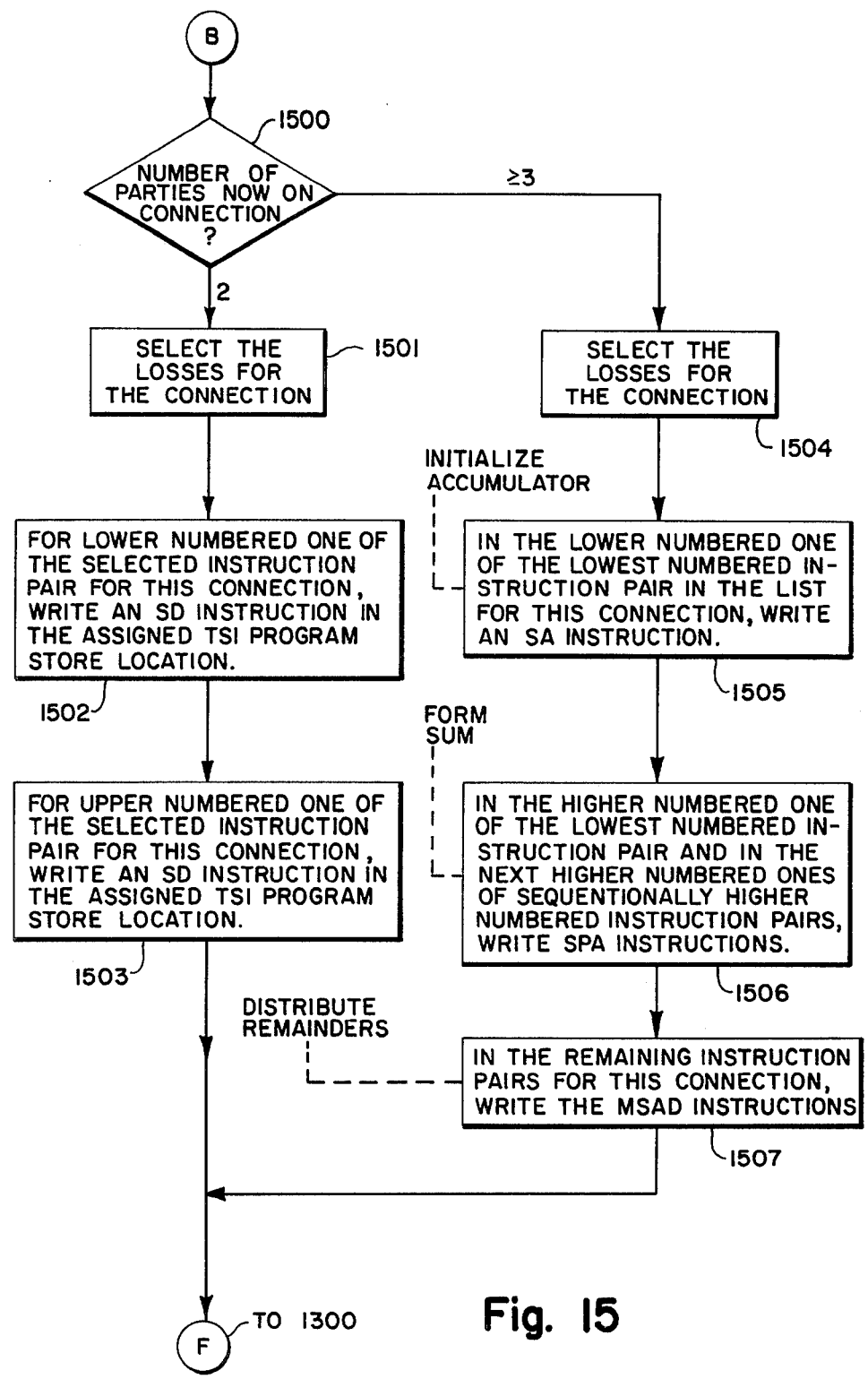

The process now advances to element F on FIG. 15 and from there back to element 1300. The call is now established and the parties may communicate with one another. No request for a change in the TSI connection occurs on this call until one party, such as party B, hangs up. At that time, element 1300 detects the change of state and element 1301 identifies the change of state as representing a call termination request. This requires that party B be deleted from the connection. The process now advances from element C on FIG. 13 to FIG. 14. Element 1400 deletes the port time slot number for party B from connection list 1 and element 1401 writes no-op instructions in program store locations 4 and 5. In elements 1402 and 1403, the TSI program store location 1 is used to write an instruction to send an idle code signal to the deleted port time slot location in the output data store for party B.

Element 1404 determines that one party (party A) remains on the connection. Elements 1406 and 1407 cause location 1 of the TSI program store to send an idle code signal to the output data store location of party A.

The process now advances from element 1407 to element G and from there back to element 1300, which determines that a connection change is required to remove party A from the call. Element 1301 detects that party A is to be deleted and the process advances from element C on FIG. 13 to element 1400 on FIG. 14. Element 1400 deletes the port time slot for party A from connection list 1. Element 1401 writes a no-op instruction in locations 4 and 5 of the program store. Elements 1402 and 1403 cause the idle code signal to be sent to the output data store locations associated with party A.

Element 1404 determines that there are no parties on the connection and element 1405 marks the instruction pair 4/5 as being idle as shown in FIG. 16 and removes all reference to this instruction pair from connection list 1 of FIG. 17. The process now advances from element G on FIG. 14 to element 1300 which awaits a request for a new TSI call connection.

The following describes the serving of a three party conference call involving parties A, B, and C using connection list 255 and using the instruction pairs shown in connection list 255 on FIG. 17.

Parties A and B are interconnected in the same manner as already described for the two party call involving parties A and B. After parties A and B are connected, element 1300 determines that an additional TSI connection change is required. Element 1301 determines that party C is to be added to the call. Element 1302 adds the port time slot for party C to connection list 255. Element 1303 determines that there are now three parties on the connection. Element 1305 searches the free pair list of FIG. 16 to select two idle instruction pairs. These two selected pairs are added to connection list 255 and the two added pairs are marked busy as shown on FIG. 16. On FIG. 17, the connection between parties A and B user pairs 6/7. Element 1305 for the currently described conference call now selects the additional pairs 124/125 and 50/51. The process now advances to element B on FIG. 13 and from there to element 1500. Element 1500 determines that there are now three parties on the call and element 1504 selects the appropriate losses required on the TSI connection. Element 1505 causes an SA instruction of the type shown in FIG. 10 to be written in the lower numbered one of the lowest numbered instruction pair in the list for this connection. For this call, the SA instruction is now written in location 6 of the TSI program store. This instruction causes speech samples from party A to be written into location 255 of the accumulator.

In element 1506, an SPA instruction is written in program store location 7. This causes the speech sample for party B to be added to that of party A and the resultant sum entered into accumulator location 255. Element 1506 also causes the SPA instruction to be written into program store location 50 which adds the speech sample of party C to that of parties A and B already in the accumulator. In element 1507, the MSAD instruction of the type in FIG. 10 is written into locations 51, 124, and 125 of the TSI program store. These instructions cause the difference signals for parties A, B, and C, respectively, to be derived and transmitted to the respective parties via output data store 134.

The process now advances to element F on FIG. 15 and from there to element 1300. The conference call connection is now fully established and the parties A, B, and C may communicate with one another. No further TSI connection change is required until elements 1300 and 1301 react to an on-hook action by a party on the call. When an on-hook condition is detected, the process advances from element C to element 1400 which deletes the port time slot of party C from connection list 255. Element 1401 writes no-op instructions in all TSI instruction pairs used on the call. Elements 1402 and 1403 cause an idle code signal to be sent to the output data store location for the first party (party C) to go on-hook. Element 1404 determines that there are now two parties on the call and the process advances to element 1308. Element 1308 marks the two highest numbered instruction pairs idle. In this case, instruction pair 124/125 and 50/51 are marked idle in the list of FIG. 16. These two pairs are removed from connection list 255 of FIG. 17. Element 1500 determines that there are now two parties on the connection and advances the process through elements 1501, 1502, and 1503, all of whose functions have already been described.

The process now advances from element F to element 1300 which, together with element 1301, detects that a second one of the three parties goes on-hook and is ready to be deleted from the connection. This is done by elements 1401 through element 1403. Element 1404 determines that only one party remains left on the connection. Elements 1406 and 1407 perform the indicated functions already described and the process advances via element G to elements 1300 and 1301, which detect that the last party remains to be disconnected. The disconnect function is performed by elements 1400 through 1403 whose functions have already been described. Element 1404 determines that no parties remain on the call. Element 1405 marks the last instruction pair, in this case instruction pair 6/7, as being idle in the list of FIG. 16 and removes the identity of pair 6/7 from connection list 255 of FIG. 17. The process now advances via element G back to element 1300 which determines that for the present call there is no request for a TSI connection change. Thus, the breakdown of the conference connection involving parties A, B, and C has been accomplished.

What is claimed is:

1. In a PCM switching system having port circuits, associated stations, and a time slot interchanger (TSI) for serving calls by controllably exchanging digital call signals between said port circuits, said TSI comprising:

a signal processor including an accumulator memory means (RAM) having a plurality of addressable locations, means responsive to the serving of a conference call between at least three of said port circuits (conferee port circuits) for assigning a unique one of said RAM locations to said conference call, means for sequentially applying digital call signals to said signal processor from each of said conferee port circuits, means including said signal processor responsive to the receipt of said digital call signals for forming a sum signal representing the sum of all of said digital call signals applied to said signal processor from said conferee port circuits, means for entering said sum signal in said assigned RAM location, means for sequentially applying digital call signals from each of said conferee port circuits sequentially to said signal processor while concurrently applying said sum signal to said signal processor from said RAM, said signal processor being responsive to each concurrent receipt of call signals from a conferee port circuit and said sum signal from said RAM for forming for each conferee port circuit a difference signal representing the difference between said sum signal and said concurrently applied call signal, and means for applying each one of said formed difference signals to the one of said conferee port circuits whose call signal is not contained in said difference signal.

2. In a PCM switching system having port circuits, associated stations, and a time slot interchanger (TSI) for serving calls by controllably exchanging digital call signals between said port circuits, said TSI comprising:

a signal processor including an accumulator memory means (RAM) having a plurality of addressable locations for serving concurrently a plurality of conference calls, means responsive to serving of each conference call between at least three of said port circuits (conferee port circuits) for assigning a different one of said RAM locations to the serving of each conference call, means for sequentially applying digital call signals to said signal processor from each of said conferee port circuits, means including said signal processor responsive to the receipt of said digital call signals for forming a sum signal for each conference call representing the sum of all of said digital call signals applied to said signal processor from said conferee port circuits on each conference call, means for entering each sum signal for a conference call in said RAM location assigned to said conference call, means for sequentially applying digital call signals from each of said conferee port circuits on a call sequentially to said signal processor while concurrently applying said sum signal for said call to said signal processor from said RAM location assigned to said call, said signal processor being responsive to each concurrent receipt of call signals from a conferee port circuit and said sum signal from said RAM for forming for each conferee port circuit a difference signal representing the difference between said sum signal and said concurrently applied call signal, and means for applying each one of said formed difference signals to the one of said conferee port circuits whose call signal is not contained in said difference signal.

3. In a PCM switching system in which calls are served during cyclically recurring time frames each having a plurality of time slots, said system having port circuits each of which is assigned to a different time slot, associated stations, and a time slot interchanger (TSI) for serving calls by controllably exchanging digital call signals between selected ones of said port circuits for each call, said TSI comprising:

an input memory having an addressable location individual to each of said port circuits, means effective during the serving of each call by said system for writing digital call signals during each time frame from each call serving port circuit into the input memory location individual to each call serving port circuit, a signal processor including an accumulator memory (RAM) having a plurality of addressable locations, means responsive to the serving of a conference call between at least three of said port circuits (conferee port circuits) for assigning a unique RAM location to the serving of said conference call, means for reading out said input memory during each time frame to apply sequentially to said signal processor digital call signals originated by each one of said conferee port circuits, means including said signal processor responsive to the receipt of said digital call signals during a time frame for forming the sum of said digital call signals by entering the call signals of a first conferee port circuit in said assigned RAM location and by adding each subsequently applied digital call signal received for each other conferee port circuit to the signal in said assigned RAM location when each subsequent digital call signal is applied to said signal processor, means for forming a unique difference signal for each conferee port circuit during each time frame by sequentially applying said call signals of each conferee port circuit from said input memory to said signal processor while concurrently applying the contents of said assigned RAM location to said signal processor, said signal processor being effective to derive the difference of said concurrently applied signals to form said difference signal, an output memory having an addressable location individual to each of said port circuits, means for entering each difference signal derived by said signal processor during a time frame into the location of said output memory unique to the conferee port circuit whose call signal is not contained in said difference signal, and means for reading out said output memory during each time frame for extending each derived difference signal from said output memory location to the associated conferee port circuit.

4. The system of claim 3 in which said TSI further comprises a program store having a plurality of addressable locations for receiving and storing instructions for controlling the function of said TSI on each conference call, means effective upon the serving of each conference call for writing a plurality of instructions into said program store for each conferee port circuit with less than all of said instruction for a conference call being in program store locations contiguous to the other instructions for said call and, means including said TSI for reading out said program store to execute all currently stored instructions during each time frame to control the exchange of the digital call signals between said conferee ports circuits during each time frame, each of said plurality of RAM locations being effective as said instructions for conference calls are executed for storing in an associated RAM location digital data derived by said signal processor for said call.

5. In a PCM switching system in which calls are served during cyclically recurring time frames each having a plurality of time slots, said system having port circuits each of which is assigned to a different time slot, associated stations, and a time slot interchanger (TSI) for serving calls by controllably exchanging digital call signals between selected ones of said port circuits for each call, said TSI comprising:

an input memory having an addressable location individual to each of said port circuits, means effective during the serving of each call by said system for writing digital call signals during each time frame from each port circuit into the input memory location individual to each port circuit, a signal processor including an accumulator memory (RAM) having a plurality of addressable locations for serving concurrently a plurality of conference calls, means responsive to the serving of each conference call between at least three of said port circuits (conferee port circuits) for assigning a different one of said RAM locations to the serving of each conference call, means for reading out said input memory during each time frame to apply sequentially to said signal processor digital call signals originated by each one of said conferee port circuits, means including said signal processor responsive to the receipt of said digital call signals during a time frame for forming the sum of said digital call signals for each conference call by entering the call signals of a first conferee port circuit on a call in said RAM location assigned to said call, and by adding each subsequently applied digital call signal received for each other conferee port circuit on the same call to the signal in said RAM location assigned to said call when each subsequent digital call signal for said call is applied to said signal processor, means for forming a unique difference signal for each conferee port circuit on a call during each time frame by sequentially applying said call signals of each conferee port circuit for said call from said input memory to said signal processor while concurrently applying the contents of said assigned RAM location for said call to said signal processor, said signal processor being effective to derive the difference of said concurrently applied signals to form said difference signal, an output memory having an addressable location individual to each of said port circuits, means for entering each difference signal derived by said signal processor during a time frame into the location of said output memory unique to the conferee port circuit whose call signal is not contained in said difference signal, and means for reading out said output memory during each time frame for extending each derived difference signal from said output memory location to the associated conferee port circuit.

6. The system of claim 5 in which said TSI further comprises a program store having a plurality of addressable locations for receiving and storing instructions for controlling the operation of said TSI on each conference call, means effective upon the serving of each conference call by said system for writing a plurality of instructions into said program store for each conferee port circuit on a call with less than all of said instructions for each conference call being in program store locations contiguous to the other instructions for said call and, means including said TSI for reading out said program store to execute all currently stored instructions for a conference call during each time frame to control the exchange of the digital call signals between said conferee port circuits on said conference call during each time frame, each of said plurality of RAM locations assigned to a conference call being effective as said instructions for said conference call are executed for storing location digital data received or derived by said signal processor for said call.

7. In a PCM switching system having port circuits, associated stations, and a time slot interchanger (TSI) for serving calls by controllably exchanging digital call signals between said port circuits, said TSI comprising:

a signal processor including an arithmetic logic unit (ALU) and an accumulator memory means (RAM) for controllably processing said digital call signals exchanged between said port circuits, means effective on a call between a first and a second port circuit for transmitting from said first port circuit both voice and non-voice data to said TSI, means for applying said voice data to said ALU for said signal processing of said voice data, means for extending said non-voice data through said TSI over a path independent of said ALU, and means for extending said non-voice data and said processed voice data concurrently to said second port circuit.

8. A method for serving conference calls in a PCM switching system having port circuits, associated stations, and a TSI for controllably exchanging digital call signals between said port circuits, said TSI comprising a signal processor including an accumulator memory (RAM) having a plurality of addressable locations, said method comprising the steps of:
(1) assigning a unique one of said addressable RAM locations to a conference call currently served by said system between three or more of said port circuits (conferee port circuits),
(2) sequentially applying digital call signals to said signal processor from each of said conferee port circuits,
(3) coadjuvantly operating said signal processor and said RAM to form a sum signal representing the sum of all of said digital call signals sequentially applied to said signal processor from said conferee port circuits,
(4) storing said sum signal in said assigned RAM location, (5) operating said signal processor to form a unique difference signal for each conferee port circuit with each difference signal representing the difference between said sum signal and a concurrently applied digital call signal from each conferee port circuit, and (6) applying each formed difference signal to the one of said conferee port circuits whose call signal is not contained in said difference signal.

9. The method of claim 8 in which said sum signal is formed by the steps of:

(1) entering a first applied digital call signal from a conferee port circuit into said assigned accumulator RAM location, (2) applying each subsequently received digital call signal from each other conferee port circuit to said signal processor together with the signal currently in said assigned RAM location, (3) operating said signal processor to form the sum of said received digital call signal and said signal received from said RAM, and (4) entering a signal representing said sum in said assigned RAM location.

10. The method of claim 9 in which each of said difference signals is formed by the steps of:

(1) applying a digital call signal from each of said conferee port circuits sequentially to said signal processor, (2) concurrently applying the sum signal in said assigned RAM location to said signal processor, and (3) operating said signal processor to form the difference between said concurrently applied signals.

11. The system of claim 10 in which said TSI includes a program store in which said method further comprises the steps of:

(1) writing a plurality of instructions for each conferee port circuit on said conference call into addressable locations of said program store with some of said instruction for each call being in program store locations not contiguous to the other instructions for said call, and (2) reading out said locations of said program store to execute the currently stored instructions to control the exchange of digital call signals between said conferee ports.

12. A method for serving conference calls in a PCM switching system having port circuits, associated stations, and a TSI for controllably exchanging digital call signals between said port circuits, said TSI comprising an input memory, an output memory, and a signal processor including an accumulator memory (RAM) having a plurality of addressable locations, said method comprising the steps of:

(1) assigning a unique one of said addressable RAM locations to a conference call currently served by said system between three or more of said port circuits (conferee port circuits), (2) writing digital call signals from each of said conferee port circuits into an input memory location individually associated with each of said conferee port circuits, (3) periodically reading out said input memory for applying said digital signals of each conferee port circuit sequentially to said signal processor, (4) coadjuvantly operating said signal processor and said RAM to form a signal representing the sum of all of said digital call signals sequentially received from said conferee port circuits by said signal processor, (5) coadjuvantly operating said signal processor and said RAM to form a unique difference signal for each conferee port circuit with each difference signal representing the difference between said sum signal and a concurrently applied digital call signal from each one of said conferee port circuits, (6) entering each derived formed difference signal for each conferee port circuit into a location of said output memory unique to each conferee port circuit, and (7) periodically reading out said output memory to extend each formed difference signal to the one of said conferee port circuits whose call signal is not contained in said difference signal.

13. The method of claim 12 in which said sum signal is formed by the steps of:

(1) entering the digital call signal applied to said signal processor from a first conferee port circuit into said assigned accumulator RAM location, (2) applying a digital call signal to said signal processor from each other conferee port circuit sequentially while concurrently applying to said signal processor the signal currently in said assigned RAM location, (3) operating said signal processor to form the sum of said received digital call signal and said signal concurrently received from said RAM, and (4) entering a sum signal representing said sum of said concurrently received signals in said assigned RAM location.

14. The method of claim 13 in which each of said difference signals is formed by the steps of:

(1) applying a digital call signal from each of said conferee port circuits sequentially to said signal processor, (2) concurrently applying the sum signal in said assigned RAM location to said signal processor, and (3) operating said signal processor to form the difference between said concurrently applied signals.

15. A method for serving conference calls in a PCM switching system having port circuits, associated stations, and a TSI for controllably exchanging digital call signals between said port circuits, said TSI comprising a signal processor including an accumulator memory (RAM) having a plurality of addressable locations for concurrently serving a plurality of conference calls, said method comprising the steps of:

(1) assigning a different one of said addressable RAM locations to each conference call currently served by said system between three or more of said port circuits (conferee port circuits), (2) sequentially applying digital call signals to said signal processor from each of said conferee port circuits, (3) coadjuvantly operating said signal processor and said RAM to form a sum signal for each conference call representing the sum of all of said digital call signals sequentially applied to said signal processor from said conferee port circuits interconnected on said conference call, (4) storing said sum signal in said RAM location assigned to said conference call, (5) operating said signal processor to form a unique difference signal for each conferee port circuit with each difference signal representing the difference between said sum signal for said call and a concurrently applied digital call signal from each conferee port circuit interconnected on said call, and (6) applying each formed difference signal for a conference call to the one of said conferee port circuits for said call whose call signal is not contained in said difference signal, 16. The method of claim 15 in which said TSI further comprises a program store and in which said method further comprises the steps of:

(1) writing a plurality of instructions for each conferee port circuit on each conference call into addressable locations of said program store with some of said instruction for each call being in program store locations not contiguous to the other instructions for said call, and (2) reading out all locations of said program store to execute the currently stored instructions to control the exchange of digital call signals between said conferee port circuits.

17. A method for serving conference calls in a PCM switching system in which calls are served during cyclically recurring time frames each having a plurality of time slots, said system having port circuits each assigned to a different one of said time slots, associated stations, and a TSI for controllably exchanging digital call signals between said port circuits, said TSI comprising an input memory, an output memory, and a signal processor including an accumulator memory (RAM) having a plurality of addressable locations for concurrently serving a plurality of conference calls, said method comprising the steps of:

(1) assigning a different one of said addressable RAM locations to each conference call currently served by said system between three or more of said port circuits (conferee port circuits), (2) writing digital call signals during each time frame from each of said conferee port circuits into an input memory location individually associated with each of said conferee port circuits, (3) reading out said input memory during each time frame for applying said digital signals of each conferee port circuit sequentially from said input memory to said signal processor, (4) coadjuvantly operating said signal processor and said RAM to form each conference call with a signal representing the sum of all of said digital call signals sequentially received by said signal processor from said conferee port circuits interconnected on each call, (5) coadjuvantly operating said signal processor and said RAM to form a unique difference signal for each conferee port circuit interconnected on a call with each difference signal representing the difference between said sum signal for said call and a concurrently applied digital call signal from each one of said conferee port circuits interconnected on said call, (6) entering each derived formed difference signal for each conferee port circuit into a location of said output memory unique to each conferee port circuit, and (7) reading out said output memory during each time frame to extend each formed difference signal to the one of said conferee port circuits whose call signal is not contained in said difference signal.

18. The method of claim 17 in which said sum signal is formed by the steps of:

(1) entering the first digital call signal applied to said signal processor from a conferee port circuit on a call into said accumulator RAM location assigned to said call, (2) applying each digital call signal subsequently applied to said signal processor from each other conferee port circuit for said call while concurrently applying to said signal processor the signal currently in said RAM location assigned to said call, (3) operating said signal processor to form the sum of each received digital call signal for a call and said signal concurrently received from said RAM location assigned to said call, and (4) entering a sum signal representing said sum of said concurrently received signals in said assigned RAM location.

19. The method of claim 18 in which each of said difference signals is formed by the steps of:

(1) applying a digital call signal from each of said conferee port circuits interconnected on a call sequentially to said signal processor, (2) concurrently applying the sum signal in said RAM location assigned to said call to said signal processor, and (3) operating said signal processor to form the difference between said concurrently applied signals.

20. The system of claim 19 in which said TSI further comprises a program store and in which said method further comprises the steps of:

(1) writing a plurality of instructions for each conferee port circuit on each conference call into addressable locations of said program store with some of said instructions for each call being in program store locations not contiguous to the other instructions for said call, (2) reading out all locations of said program store during each time frame to execute the currently stored instructions to control the exchange of digital call signals between said conferee ports during each time frame, (3) storing said call data in each of said RAM locations serving a conference call as said instructions are executed on conference calls, and (4) writing new instructions into selected program store locations during each time frame following the execution of the instructions priorly in said selected locations.

* * * * *